(12) United States Patent
Agrawal et al.

(10) Patent No.: US 8,229,294 B2
(45) Date of Patent: Jul. 24, 2012

(54) CAMERAS WITH VARYING SPATIO-ANGULAR-TEMPORAL RESOLUTIONS

(75) Inventors: Amit Kumar Agrawal, Somerville, MA (US); Ashok Veeraraghavan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 152 days.

(21) Appl. No.: 12/562,485

(22) Filed: Sep. 18, 2009

(65) Prior Publication Data

US 2010/0003024 A1   Jan. 7, 2010

(51) Int. Cl.
*G03B 41/00* (2006.01)
(52) U.S. Cl. ......... 396/340; 398/207; 356/310; 348/499
(58) Field of Classification Search .................. 396/340; 398/207; 356/310; 348/499
See application file for complete search history.

(56) References Cited

U.S. PATENT DOCUMENTS

| 2,950,644 | A | * | 8/1960 | Land et al. | 352/44 |
|---|---|---|---|---|---|
| 3,590,712 | A | * | 7/1971 | Ataka | 396/340 |
| 5,579,157 | A | * | 11/1996 | Tanaami et al. | 359/368 |
| 5,627,639 | A | * | 5/1997 | Mende et al. | 356/310 |
| 6,173,087 | B1 | * | 1/2001 | Kumar et al. | 382/284 |
| 6,864,916 | B1 | * | 3/2005 | Nayar et al. | 348/224.1 |
| 2002/0191178 | A1 | * | 12/2002 | Watkins et al. | 356/237.2 |
| 2003/0016884 | A1 | * | 1/2003 | Altunbasak et al. | 382/299 |
| 2004/0109164 | A1 | * | 6/2004 | Horii et al. | 356/479 |
| 2004/0218246 | A1 | * | 11/2004 | Onuki et al. | 359/234 |
| 2005/0104969 | A1 | * | 5/2005 | Schoelkopf et al. | 348/207.99 |
| 2007/0230944 | A1 | * | 10/2007 | Georgiev | 396/322 |
| 2007/0241266 | A1 | * | 10/2007 | Gweon et al. | 250/225 |
| 2007/0258707 | A1 | | 11/2007 | Raskar | |
| 2008/0007626 | A1 | * | 1/2008 | Wernersson | 348/211.9 |
| 2008/0116362 | A1 | * | 5/2008 | Feldman et al. | 250/237 R |
| 2008/0187305 | A1 | * | 8/2008 | Raskar et al. | 396/268 |
| 2009/0079299 | A1 | * | 3/2009 | Bradley et al. | 310/322 |
| 2010/0098323 | A1 | * | 4/2010 | Agrawal et al. | 382/154 |

OTHER PUBLICATIONS

Liang et al., "Programmable Aperture Photography: Multiplexed Light Field Acquisition," ACM Trans. Graphics 27, 3, 55:1-55:10, 2008.

* cited by examiner

*Primary Examiner* — Rodney Fuller
*Assistant Examiner* — Fang-Chi Chang
(74) *Attorney, Agent, or Firm* — Dirk Brinkman; Gene Vinokur

(57) ABSTRACT

A camera includes a lens and a sensor. A dynamic mask is arranged at an aperture plane between the lens and the sensor, and a static mask is arranged immediately adjacent to the sensor. Angular, temporal or spatial variations in light rays acquired of a scene by the sensor are mapped to individual pixels of the sensor.

25 Claims, 5 Drawing Sheets

100

200

CAMERAS WITH VARYING SPATIO-ANGULAR-TEMPORAL RESOLUTIONS

FIELD OF THE INVENTION

This invention relates generally to cameras and computational photography, and more particularly to trading-off spatio-angular-temporal resolutions in images acquired with cameras equipped with masks in the optical path.

BACKGROUND OF THE INVENTION

Computational Photography

One goal of computational photography is to trade-off simplicity of image acquisition and enhanced post-processing. For example, a lower spatial resolution can be traded-off for a higher angular resolution to support digital refocusing. Similarly, high speed cameras trade-off spatial resolution for temporal resolution.

A focused micro-lens (lenslet) array placed near or on a camera sensor can sample angular variations at the aperture plane of the camera at spatial location of the sensor to acquire a low spatial resolution light field. Alternatively, a combination of a positive lens and prism can placed in front of the main lens. Frequency domain modulation of light fields is also known. There, a modulated light field is acquired by placing a sum of cosines mask near the sensor. All of these techniques trade-off a lower spatial resolution to acquire other dimensions of the light field acquired of static scenes.

Multiplexing and Coding

Multiplexed sensing, using Hadamard codes, can increase the signal to noise ratio (SNR) during image acquisition. Hadamard codes use a generalized class of Fourier transforms. Other codes can also decrease sensor noise and saturation. Modified uniform random array (MURA) codes can improve SNR in non-visible imaging. Invertible codes can reduce blur in out-of-focus images. Wavefront coding extends the depth of field (DOF) using cubic phase plates at the aperture plane. Combined amplitude and phase masks can extend the DOF. An array of attenuating layers in a lenslet can provide split field of view, which cannot be achieved with a single lens. An optical mask sensor with spatially varying transmittance near the sensor can be used for high dynamic range (HDR) imaging. Other imaging modulators include digital micro-mirror arrays, holograms, mirrors.

Motion

Motion results in dynamic scenes. A quadrature pair of oriented filters applied to a static image can simulate motion. Push-broom cameras and slit-scan photography, which acquire images a row of pixels at a time, can be used for finish-line photos and satellite imaging to avoid motion blur and to acquire interesting motion distortions. High speed camera can acquire complete motion information. However, high speed cameras are expensive, and require a high bandwidth and do not allow digital refocusing of moving objects.

Mapping Methods

Optical information in a non-geometric dimension, such as color, can be mapped to a geometric dimension. Bayer filter mosaics map wavelength information directly to sensor pixels by trading-off spatial resolution. With a prism at the aperture plane, wavelength (color) can be mapped to angular dimensions in a 2D image. Pupil-plane multiplexing can acquire polarization as well as color information.

5D Plenoptic Function (5DPF)

A plenoptic function (PF) is the entire holographic representation of the visual world available to an observer or sensor at any point in space and time. Ignoring wavelength and polarization effects, the PF can be described by time-varying 4D light fields in free-space. For a two-plane parameterization, the sensor plane is (x, y), the aperture plane is $(\theta_x, \theta_y)$, and the 5DPF is $L_0(x, y, \theta_x, \theta_y, t)$, where t is time. Inherent structures in a scene lead to redundancies in the 5DPF.

Cameras

The following cameras sample subsets of the 5DPF with underlying assumptions about the scene.

Conventional Camera: A conventional camera assumes the scene is in-focus and static during the exposure time. Hence, angular and temporal variations in the 5DPF are absent. Thus, the conventional camera provides an adequate and accurate characterization of the resulting 2D subset of the 5DPF.

Video Camera: A video camera assumes that the scene is in-focus but changing over time. By assuming a lack of angular variations, the video camera provides an adequate characterization of the resulting 3D subset of the 5DPF.

Light-Field Camera: A light-field camera assumes absence of temporal variations and acquires a 4D subset of the 5DPF.

Each camera only works when the scene has the assumed redundancy for the camera. When the assumptions are not met, the acquired images can have artifacts, such as focus blur, motion blur, highlights, and specularities.

SUMMARY OF THE INVENTION

The embodiments of the invention provide a method and apparatus to convert a single image to a set of images, wherein the set of images can vary in time, focus, and resolution, or combinations thereof.

The image is acquired with a dynamic mask arranged between a lens and sensor at an aperture plane of a camera, and a static mask immediately adjacent to the sensor. The dynamic mask reversibly encodes temporal variations in the scene into angular variations in a lightfield.

By exploiting redundancy in light samples, the invention provides a programmable trade-off in resolution among spatial, angular and temporal dimensions. This enables a user to select an appropriate spatial, focus, or temporal resolution after image acquisition.

The method and camera enables novel results, such as, refocusing on objects moving in depth, and acquiring multiple facial expressions in a single image.

DETAILED DESCRIPTION OF THE PREFERRED EMBODIMENT

Figure 1A:
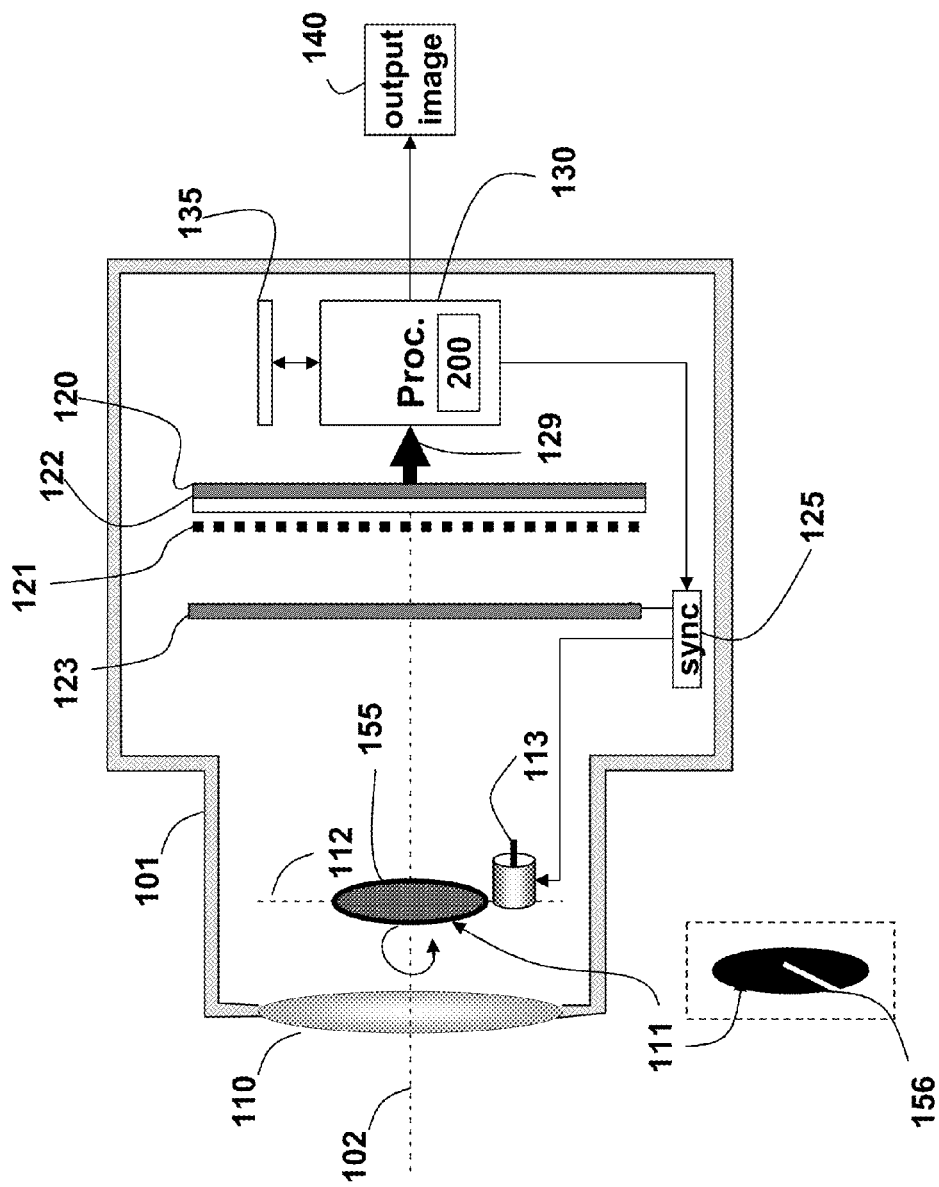
FIG. 1A is a block diagram of a camera according to embodiments of the invention.

FIG. 1A shows an apparatus 100 and method 200 according to embodiments of our invention. The Figure is not to scale, and elements are placed to easier show various features. The apparatus is in the form of camera arranged inside a body 101. The camera includes a lens 110 and a sensor 120. A dynamic mask 111 is placed at an aperture plane 112. A static heterodyne mask 121 is placed immediately adjacent to the sensor. That is, the mask 121 is placed on or near the surface of the sensor facing the lens. The optical elements are aligned on an optical axis 102 of the camera.

The camera also includes a processor 130 for performing steps of the method 200. The processor can be a single or multi-core microprocessor as known in then art, including input/output interfaces and memories. The processor can perform conventional functions, such as image stabilization, zoom, exposure and focus control, noise reduction, image organization, and the like. The method 200 is performed on a single input image 129 acquired by the sensor. The processor produces a set of output images 140. As defined herein, the set can include one or more output images. The camera can also include a memory card 135 for storing the input and output images.

The lens is achromatic and has a 160 mm focal length. The dynamic mask is circular and made of plastic with an appropriate pattern of pin holes 155 to provide the desired dynamic coding. The pin holes are spread across the entire plane of the aperture. Alternatively, the dynamic mask includes a slit, see inset 156. The mask is rotated by a servo motor 113. A shutter 123 is synchronized 125 with the rotating mask 111 to intermittently block light at the aperture during rotation of the mask.

Alternatively, the dynamic mask includes low resolution liquid crystal diodes (LCD) at the aperture plane, which can be modulated. However, color LCDs can lead to diffraction due to RGB pixels. Monochrome LCDs have a larger pixel size but a lower contrast ratio (1:10), and lose at about 50% of light, which significantly lowers the SNR. Monochrome LCDs, such as used in projectors have good contrast ratio, suffer from severe diffraction due to small feature size ($\approx 6$ microns), and low fill factor due to gaps between the pixels for wiring.

The sensor has a resolution of 22 megapixels. A$\approx$1 mm protective glass plate 122 separates the static mask from the sensor. This allows a maximum aperture of f/8 for 11×11 angular resolution, and 242×182 color spatial resolution. For the 160 mm focal length lens, a size of the aperture size at f/8 is 20 mm. We prefer a sum of cosine masks for the static mask. A tiled broadband mask can be used to improve light throughput.

When a sequence of images is acquired, the minimum feature size in at the aperture plane can reduce to 20/3 mm, which leads to a diffraction blur of three pixels for green wavelength. To account for this, we appropriately place gaps between the pinholes of the dynamic mask. We use up to eight seconds for the exposure time for indoor scenes.

Alternatively, we can use a lenslet array near the sensor for acquiring the angular variations of the light on the sensor, thereby increasing light throughput. If the camera has a temporal image rate of T, then each pixel integrates light for the time interval T. Because we lose spatial resolution by a factor of $K^2$, the equivalent pixel for a video sequence is $K^2$ times larger, and hence collects $K^2$ times more light. By using Hadamard codes for the dynamic mask at the aperture plane, each pixel can collect light for $K^2/2$ images, and the light loss is reduced to one half. Similarly, using Hadamard codes at the aperture plane for static scenes loses light by a factor of two in comparison with fully open aperture, for the same exposure time.

A brute force acquisition of the 5DPF reduces spatial resolution by a factor equal to the product of temporal and angular resolution independent of the scene. Thus, the spatial resolution reduces by a factor of $K^4$. However, our method uses the $K^2$ angular samples either for $K^2$ angular resolution, $K^2$ temporal resolution, or K angular with K temporal resolution, depending on the scene.

Our camera is different than a heterodyning camera, U.S. 2008/0187305, "4D light field cameras," Raskar, filed Feb. 6, 2007. That camera only acquires the angular variations in the rays at the sensor. That camera does not modulate the rays at the aperture plane. The output of that camera is unusable for dynamic scenes.

Our camera is also different than a masked aperture camera, Liang, "Programmable aperture photography: Multiplexed light field acquisition," ACM Trans. Graphics 27, 3, 55:1-55:10, 2008. They acquire multiple images for light field reconstruction by changing the aperture mask for each image, without any mask close to the sensor. That camera acquires multiple images for light field reconstruction by changing the aperture mask for each image. There is no mask near the sensor. That camera is also unusable for dynamic scenes.

Both of those cameras only acquire the 4DPF for static scenes. Both the Liang and the Raskar cameras cannot be used with scenes that include motion, i.e., dynamic scenes.

Figure 1B:
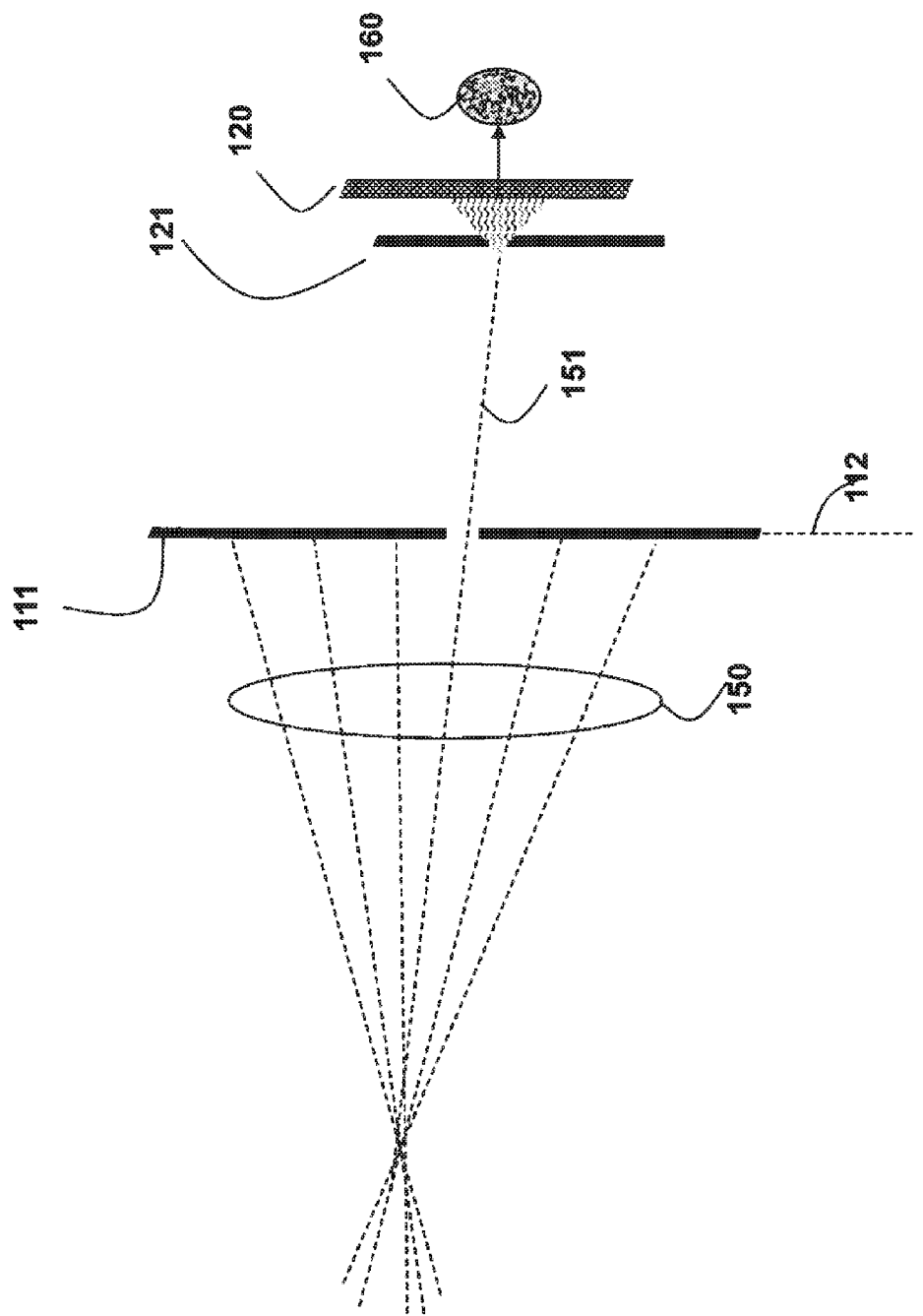
FIG. 1B is a schematic of lights paths or rays in the camera of FIG. 1A.

In contrast and as shown in FIG. 1B, we modulate the light rays 150 with aperture mask 111 within a single exposure time, as well as acquire those variations using the static mask 121 adjacent to the sensor 120. At any one time, only a subset of rays 151 is selected to be integrated by the sensor as a "spot" 160.

Light Field Mapping

Figure 2:
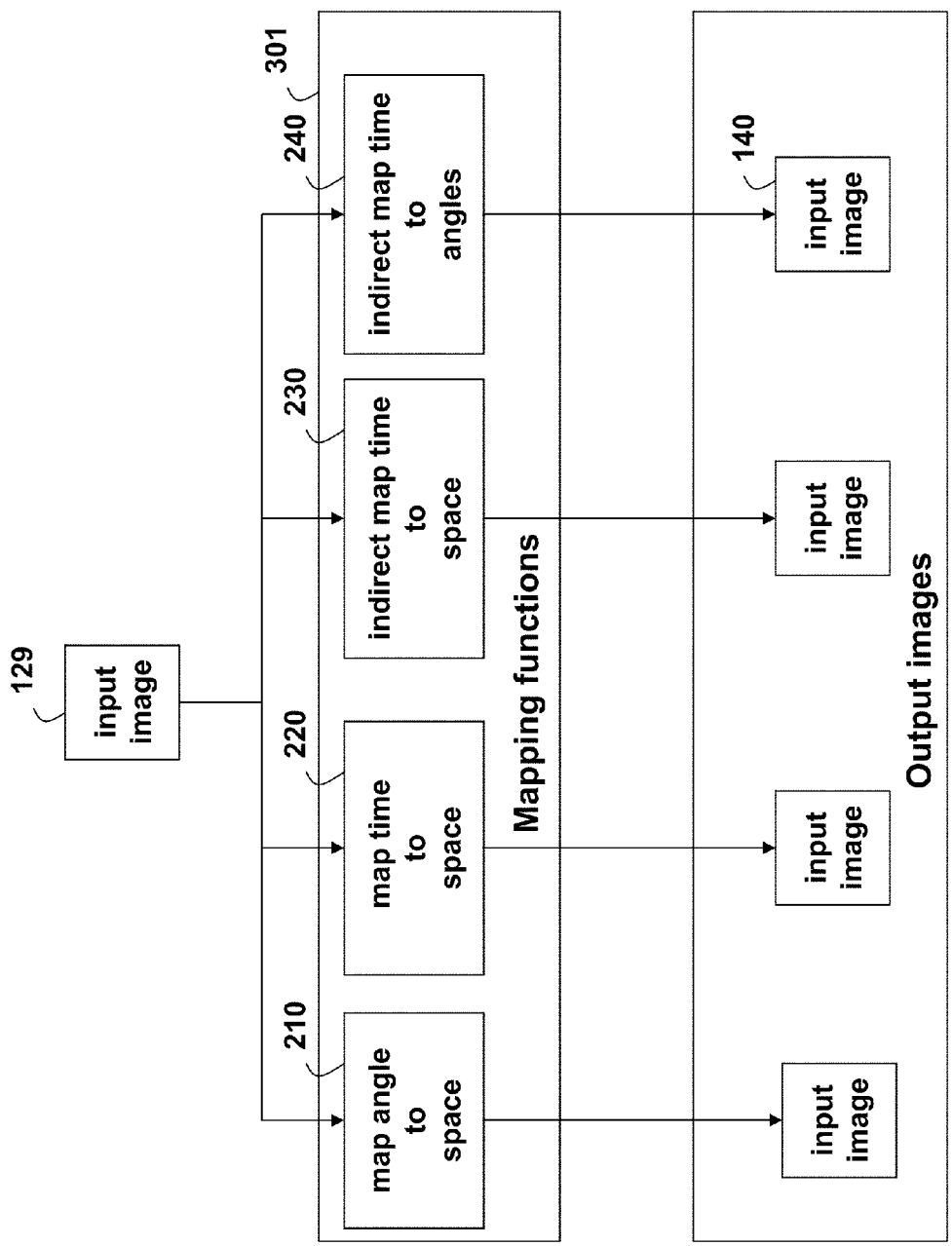
FIG. 2 is a flow diagram of a method for post-processing images acquired by the camera of FIG. 1 according to embodiments of the invention.

As shown in FIG. 2, we acquire the scene in the single input image 129. We map 210 the variations in angular and temporal dimensions into spatial intensity variations on the sensor.

For static scene parts, we can directly map the angular variations in rays 210 to pixels and acquire a 4D light field.

For dynamic scenes in focus, we indirectly map 230 temporal variations in rays to pixels, by mapping temporal variations in rays to angular variations using the dynamic aperture mask.

For Lambertian scenes the angular variations in rays are the same in horizontal and vertical direction in the aperture plane. In Lambertian scenes, the light is scattered so that the apparent brightness is the same regardless of the view (isotropic luminance). By using a vertical slit in aperture instead of pinholes, we can map angular variations in rays to a vertical dimension and temporal variation in rays to a horizontal dimension.

Mapping Angle to Space

The angular variations in rays 150 can be acquired by mapping 210 the angular variations in rays to pixels on the sensor. This is accomplished by the arrangement of a high frequency pattern on the static mask 121 or lenslets adjacent to the sensor. The heterodyning mask samples a linear combination of rays at each sensor pixel, which can be inverted in the frequency domain. Heterodyning acquires the light field by taking linear combination of rays and inverting the combination. The lenslet based design in a ray-binning approach directs rays to pixels.

Direct Mapping Time to Space: Temporal variations can be mapped 220 to the sensor by controlling light integration within the exposure time T. In order to acquire N low resolution images in a single exposure time, every $N^{th}$ pixel is integrates light only for a T/N time period. This is similar to a Bayer mosaic filter, which maps wavelength to space.

Indirect Mapping Time to Space: Indirect time to space mapping 230 can be achieved by mapping temporal variations in rays to angular variation in rays and acquiring the angular variations using the light field camera.

The embodiments of the present invention implement indirect mapping by using the dynamic mask at the aperture plane, and the static adjacent to the sensor.

Re-Interpreting Pixels

Our camera "rebins" the rays to pixels. Each ray entering the camera is mapped to a pixel. The rays correspond to angular, temporal or spatial variations in the acquired scene. For example, a static scene in sharp focus has only spatial variations and no angular or temporal variations. A moving object in sharp focus has both temporal and spatial variations in rays. A static out of focus scene has both spatial and angular variations in rays, but no temporal variations. Our camera enables the user flexibility to acquire these rays in such a way that post-processing produce different outputs for different parts of the scene.

For example, static in-focus parts of the scene can be reconstructed at high spatial resolution from the single image, while a low spatial resolution video can be obtained for moving in-focus objects in the image. Then, the acquired radiance is interpreted as spatial, angular or temporal samples of the 5DPF.

Optical Design

Our static heterodyning mask is equivalent to a static pinhole array placed at a distance d from the sensor, such that individual pinhole images ("spots") 160 do not overlap with each other due to f-number matching). Each pinhole results in angular variations across the aperture on K×K pixels.

For a sensor resolution of P×P pixels, this arrangement acquires a light field with a spatial resolution of $$\frac{P}{K} \times \frac{P}{K},$$

and angular resolution of K×K. To map temporal variations to angular variations, the exposure time T of the camera is partitioned into $K^2$ intervals of duration $T/K^2$ and the aperture mask is partitioned into a grid of K×K locations. During each of the $K^2$ intervals, one of the $K^2$ locations at the aperture plane is open, while all others are closed. This heterodyning design with moving pinholes at the aperture plane achieves the objectives of post-acquire flexibility about scene characteristics. Light loss can be minimized by using Hadamard codes for the aperture mask, and a tiled-broadband/cosine mask at the sensor as described below.

Static Scenes

For a single image, the dynamic mask does not effect the images, other than extending the exposure time. For static scene, the dynamic mask does not affect the angular variations of the light rays over time. Each pinhole position acquires a subset of the rays 151 at the aperture plane. As long as the pinholes in the dynamic mask covers the entire aperture, all angular variations in the light field are eventually acquired. Thus, over time, the input image acquired with the dynamic mask would be equivalent to an image acquired with no mask for a shorter exposure time.

The light is attenuated by a factor of $K^2$, and the acquired image can be used to recover the light field with an angular resolution of K×K and a spatial resolution of $$\frac{P}{K} \times \frac{P}{K}.$$

As shown in FIGS. 3A-3E, our digital refocusing can be performed on static parts of the scene independent of moving objects, which results in some interesting artifacts on the moving parts.

Figure 3C:
FIGS. 3B-3E is an example set of output images obtained from the input image of FIG. 4 is an example input image of a face acquired by the camera of FIG. 1.
Figure 3B:
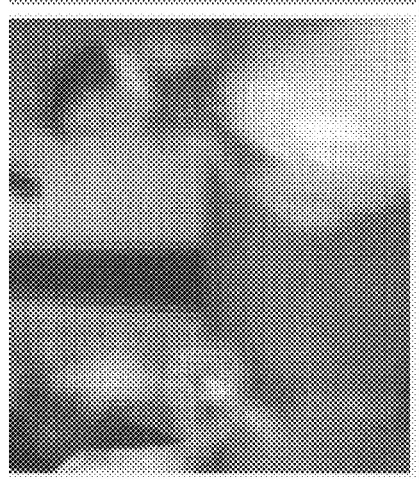
Figure 3A:
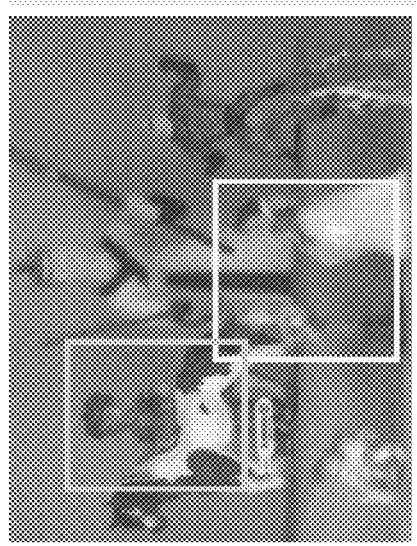
FIG. 3A is an example input image of a scene acquired by the camera of FIG. 1.
Figure 3E:
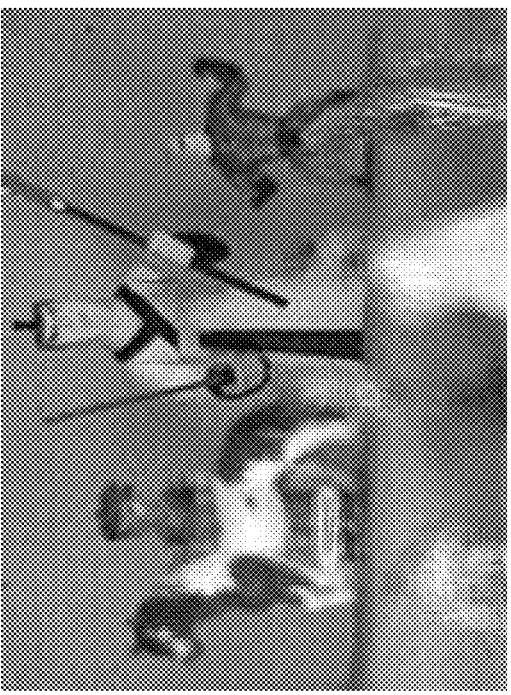
Figure 3D:
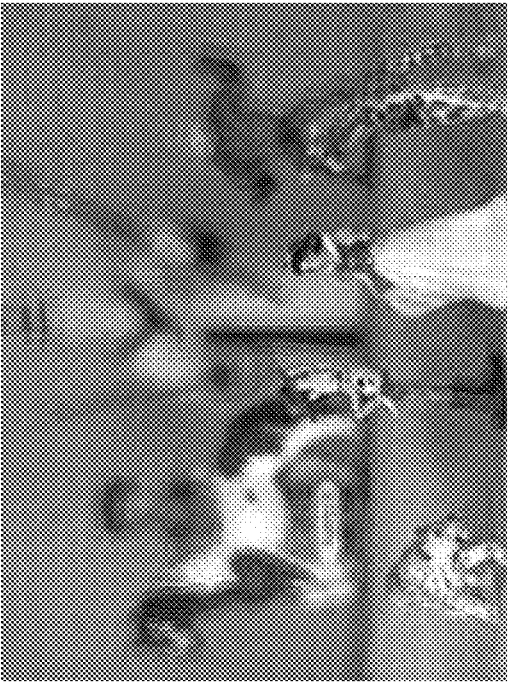

FIG. 3A shows a single input image acquired by the sensor. FIGS. 3B-3E show a set of images that can be obtained from the image in FIG. 3A. FIG. 3B is a zoom in image that is out of focus. FIG. 3C is a zoom in focus. The image in FIG. 3D has the foreground in focus, and the image in FIG. 3D has the background in focus. The out of focus blur on the static parts in the scene corresponds to the shape of the aperture. All static parts in the scene are in-focus in the recovered image, as one would expect from a light field.

In-Focus Static Scene

We can recover high resolution 2D images for in-focus static parts of the scene. The static mask attenuates the image of in-focus parts by the spatially varying attenuation pattern of the mask. A uniform intensity Lambertian plane can be used to compensate for this by normalizing with a calibration image.

The dynamic mask has the following additional effect. For each in-focus scene parts, the cone of rays focuses perfectly on a sensor pixel. Because the scene is static, this cone of rays does not change during the exposure time. Thus, the spatial resolution on a static part can be increased beyond the resolution in the refocused image obtained using the light field. The moving pinhole of the dynamic mask allows rays of the cone to enter the camera at different time intervals. Moreover, because the scene is in-focus, all rays within the cone have the same radiance. The effect of moving pinhole is to attenuate the intensity by a factor of $K^2$.

In-Focus Dynamic Scenes

If the scene is in-focus and static during the exposure time, the cone of rays 150 at the aperture plane 112 has the same radiance at a given time instant. By acquiring any subset of rays 151, we can record the scene radiance at that time instant. This can be utilized to acquire different subsets of rays at different time instants to acquire images of the dynamic scene. The moving pinholes of the dynamic mask exactly achieve this. The effect of the moving pinhole mask at the aperture plane is to map rays at different time instants to different angles, i.e. to indirectly map 240 time to angles.

The 'views' of the acquired light field now automatically correspond to different images of an image sequence (video) with temporal variations at lower spatial resolution for moving parts. Thus, one can convert the acquired P×P image into $K^2$ temporal images, each with a spatial resolution of $$\times \frac{P}{K}$$

pixels.

Out of Focus Dynamic Lambertian Scenes

An object moving towards or away from the camera experiences both focus blur and motion blur in the acquired image. Methods are known for correcting one or the other, see U.S. 20070258707, "Method and apparatus for deblurring images," Raskar, and U.S. 20080187305, "4D light field cameras," Raskar. However, none of those method can simultaneously correct motion blur and focus blur. Those methods require estimation of point spread function (PSF), and deblurring to recover an in-focus object.

If parts of a dynamic scene are out-of-focus, we cannot differentiate between the temporal and angular variations because both of result in angular variations in the rays. Because we map temporal variations to angles, we cannot acquire both temporal and angular variations simultaneously, as such. However, we use redundancy in the 5DPF to acquire both these variations as follows.

In general, the light field has two angular dimensions. For Lambertian scenes, the radiance of a scene point is the same in all directions, and the angular information is redundant. If we acquire the angular information using only one dimension, i.e., in a 1D parallax image, by placing a slit at the aperture plane, the resulting 3D light field has all the information for Lambertian scenes. This 3D light-field enables refocusing as for the 4D light-field. Because the out-of-focus blur depends on the aperture shape, it is one dimensional instead of two dimensional for regular full aperture light fields.

Our key idea is to map the temporal variations in the scene to the 'extra' available angular dimension. By moving a vertical slit horizontally in the aperture plane, we can map the temporal variations to the horizontal dimension and angular variations to the vertical dimensions of the acquired light field. For an in-focus dynamic scene, temporal variations are mapped to both the angular dimensions of the light field (horizontal and vertical) by moving the pinholes as described above. Thus, the P×P image is converted to $K^2$ temporal images, each with a spatial resolution of $$\frac{P}{K} \times \frac{P}{K}$$

pixels. The $K^2$ images correspond to refocusing K angular samples independently for K different instants in time. This allows digital refocusing on moving objects. We do not require a moving slit in the aperture plane when the scene is slowly changing. Thus, the same acquired image can be interpreted differently during post-processing. In general, we acquire up to 4D subsets of 5DPFs using our camera.

Applications

Light Field for Static Scene

With our camera, we can preserve a higher spatial resolution for in-focus scene parts.

Region Adaptive Output

For a scene with static and moving parts, in-focus features of the moving parts can be recovered. The angular samples also allow digital refocusing for static parts in the foreground and the background.

Motion Depiction

With a conventional camera, it is difficult to depict motion in a single image because the sensor integrates light during the exposure time, and object motion results in motion blur. For dynamic scenes, our acquired input image 129 is novel and provides an interesting way of depicting motion.

Similar to the heterodyning, our camera acquires a 4D light field for static scenes. For in-focus and static parts, a high spatial resolution is preserved. By acquiring 1D parallax and motion information, we can digitally refocus on parts moving in depth, while maintaining the correct occlusions and disocclusions (i.e., where one object moves behind another and disappears) between the moving and static parts.

Novel Effects

We can generate novel effects, such as keeping a static object in sharp focus while moving the object out of focus without any motion blur.

Acquiring Facial Expressions

It is a challenge to acquire a pleasing photograph of a face. Often, such a photo session requires the photographer to acquire many photos. One solution is to continuously acquires images in a buffer, and the select the best.

Figure 5:
FIG. 5 is an example set of output images obtained from the input image of FIG. 4.
Figure 4:
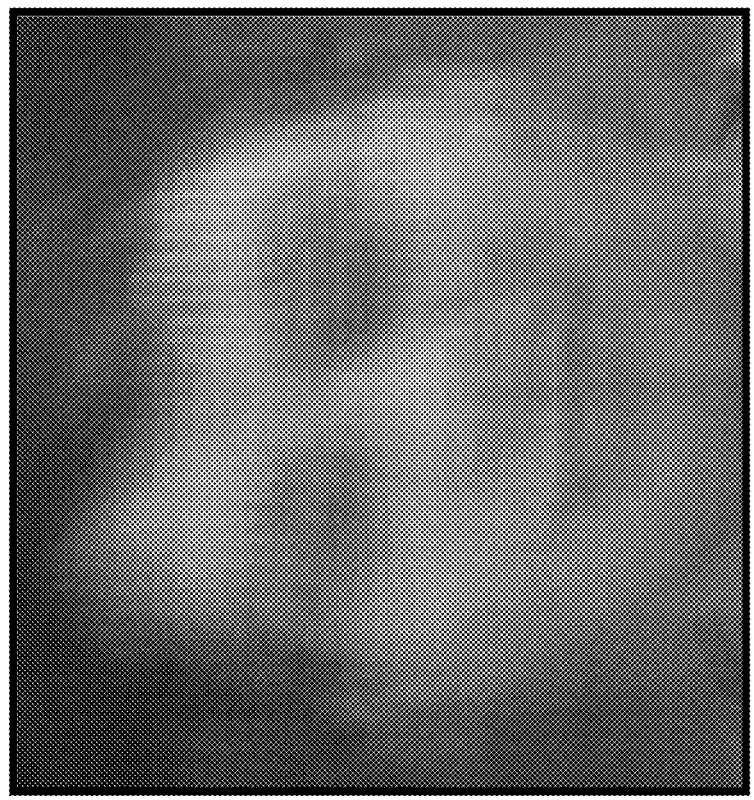

FIG. 4 shows a single image that is acquired of a face. Please note, FIG. 4 is not a composited image of a video sequence. FIG. 5 is a set of output images with nine different facial expressions recovered from the single input image using the post-processing method 200 according to embodiments of the invention. The recovered images can now be further combined using software techniques, such as digital photomontage, for generating novel images.

EFFECT OF THE INVENTION

Digital photography imposes difficult choices on the photographer due to limited abilities of a camera. Several of the choices are taken as rules of thumb. Professional photographers typically make key decisions about aperture, focus and exposure-time during a photo-session.

The invention enables the user to defer some of these choices to post-processing time. The invented camera can simultaneously handle motion and focus blur in acquired images. Using dynamic and static masks in the camera, a video, 4D lightfield or high resolution image can be recovered from a single image, without prior scene knowledge.

In medical and scientific microscopy, the ability to refocus on moving objects is beneficial. Although the example masks described herein are attenuators, angle dependent holographic masks can acquire of the complete 5D plenoptic function.

Our camera has several benefits. Conceptually, we provide a lightfield camera, a video camera and a 2D image camera within the single camera body 101. In contrast with a conventional video or a lightfield camera, in absence of variations along temporal or angular dimensions, samples are not wasted.

Unlike techniques based on motion deblurring for removing blur, recovery of video images by our method does not require deblurring or knowledge of motion PSF allowing us to acquire arbitrary scene changes within the exposure time.

Decision about the redundancy exhibited by the 5DPF can be made during the post-processing. Our optical design acquires radiance at every pixel. The radiance can be interpreted as spatial, angular or temporal samples of the plenoptic function. The recovered resolution along different dimensions in each of these cases is different, although the effective resolution, i.e., the product of spatial, angular and temporal resolution, is equal to the number of sensor pixels.

As an advantage for a single optical arrangement, we can trade-off spatial, angular and temporal resolution as required by the scene properties. This trade-off is done by our method after image acquisition, which means that the user can actually recover the output under each of these assumptions to determine which scene interpretation is appropriate.

We believe this is the first camera ever that enables such flexibility.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

Mask based designs can be generalized as placing a static/dynamic mask in aperture, on-sensor and/or near-sensor plane. The mask modulated the light rays entering into the camera by a modulation function $m(x, y, \theta_x, \theta_y, t)$. The modulated plenoptic function at the sensor plane is given by $$L(x,y,\theta_x,\theta_y,t) = L_0(x,y,\theta_x,\theta_y,t) m(x,y,\theta_x,\theta_y,t), \quad (1)$$

The captured sensor photo $I(x,y)$ is an integral of the plenoptic function along the temporal and angular dimensions.

$$I(x, y) = \int \int \int_0^T L(x, y, \theta_x, \theta_y, t) d\theta_x d\theta_y dt. \quad (2)$$

Coding Aperture: The modulation function due to a dynamic coded aperture, $m_\alpha$, takes the form $$m_\alpha = m(\theta_x, \theta_y, t), \quad (3)$$

since it modulates the incoming rays in the aperture plane of all spatial locations similarly. Thus, modulating the aperture in a single-shot can control the angular variations in the rays but it cannot capture those variations. However, using multiple photos, the angular variations can be captured [Liang et al. 2008].

Coding Near Sensor: By shifting the modulation function close to the sensor, one can modulate the light rays in both spatial and angular dimensions simultaneously. The modulation function $m_{ns}$ due to a static placed at a distance d from the sensor is given by $$m_{ns} = m(z_x, z_y), \quad (4)$$

where $$z_x = \frac{d\theta_x + (1-d)x}{v}, z_y = \frac{d\theta_y + (1-d)y}{v}$$

and v denotes the distance between the sensor and the aperture [Veeraraghavan et al. 2007]. This corresponds to mapping angle to space for capturing angular variations.

Coding On Sensor: A modulation function on the sensor plane, $m_s$, takes the form $$m_s = m(x,y,t), \quad (5)$$

since it affects all rays impinging on any pixel equally, independent of their direction. Thus, it cannot capture angular variations in rays but allows mapping temporal variations in the scene directly to different pixels (direct mapping of time to space).

Coding in Aperture and Near-Sensor: Our design as explained in Section 3.1 comes under this category. By dynamically changing the mask in the aperture, we control the angular variations in the rays, which are also captured using a static mask in the near-sensor plane. Thus, temporal variations are mapped to angular variations (indirect time to space mapping). The modulation function is given by $$m_{\alpha,ns}(x,y,\theta_x,\theta_y,t) = m_\alpha(\theta_x,\theta_y,t) m_{ns}(z_x,z_y), \quad (6)$$

where $m_{ns}$ is given by (4). If a moving pinhole mask is used in aperture then $$m_\alpha(\theta_x,\theta_y,t) = \delta(\theta_x - t_x, \theta_y - t_y), \quad (7)$$

where $t_x = t(\bmod K)$ and $$t_y = \left\lfloor \frac{t}{K} \right\rfloor.$$

We claim:

1. An apparatus, comprising:
   a lens;
   a sensor having a spatial resolution of P×P pixels;
   a dynamic mask having an angular resolution of K×K locations arranged at an aperture plane between the lens and the sensor; and
   a static mask arranged immediately adjacent to the sensor, wherein the sensor acquires a light field with a spatial resolution of $$\frac{P}{K} \times \frac{P}{K},$$

and angular resolution of K×K.

2. The apparatus of claim 1, wherein the static mask is a high frequency heterodyne mask.

3. The apparatus of claim 1, further comprising:
   a processor connected to the sensor, wherein the sensor acquires a single input image for the processor, and the processor produces a set of output images.

4. The apparatus of claim 3, wherein the input image is acquired of a dynamic scene, and temporal variations in light rays from the scene are mapped to angular variations by the dynamic mask, and further comprising
   acquiring the angular variations at the sensor as a light field using the static mask.

5. The apparatus of claim 4, wherein moving parts of the dynamic scene are recovered.

6. The apparatus of claim 3, wherein the input image is acquired of a static scene, and variations in angular and temporal dimensions of light rays from the scene are mapped by the static mask to spatial intensity variations on the sensor.

7. The apparatus of claim 6, wherein the output images of the set are different for different parts of the scene.

8. The apparatus of claim 6, wherein in-focus parts of the static scene have a higher spatial resolution in the set of output images.

9. The apparatus of claim 1, wherein the dynamic mask is configured to rotate and includes a pattern of pin holes.

10. The apparatus of claim 1, wherein the dynamic mask is configured to rotate and includes a slit.

11. The apparatus of claim 10, wherein angular variations in light rays from a scene are mapped to a vertical dimension and temporal variation in the light rays are mapped to a horizontal dimension.

12. The apparatus of claim 1, wherein the dynamic mask includes low resolution liquid crystal diodes.

13. The apparatus of claim 1, further comprising:
    a glass plate separating the static mask and the sensor.

14. The apparatus of claim 1, wherein the static mask is a sum of cosine masks for the static mask.

15. The apparatus of claim 1, wherein the static mask is a tiled broadband mask.

16. The apparatus of claim 1, wherein the static mask is a lenslet array.

17. The apparatus of claim 1, wherein the dynamic mask use Hadamard codes.

18. The apparatus of claim 1, wherein the static mask is an array of uniformly spaced pinholes.

19. The method for acquiring an input image of a scene, comprising:
  modulating a light field from a scene entering a camera through a lens at an aperture plane using a dynamic mask; and
  acquiring the modulated light field at a sensor as a single image using a static mask placed immediately adjacent to the sensor, wherein temporal variations of the light field are mapped to angular variations by partitioning an exposure time T into $K^2$ intervals of duration $T/K^2$, and during each of the $K^2$ intervals, only one of the $K^2$ locations of the dynamic mask is open, while all other locations are closed.

20. The method of claim 19, further comprising:
  producing a set of output images from the single image using a processor connected to the sensor.

21. The method of claim 19, wherein the scene is static, and further comprising:
  converting the input image to a high resolution image.

22. The method of claim 19, further comprising:
  converting the input image to a four-dimensional plenoptic function.

23. The method of claim 19, further comprising:
  refocusing the single image at different depth planes of the scene.

24. The method of claim 19, wherein the scene is dynamic, and further comprising:
  converting the input image to a low spatial resolution video.

25. The method of claim 19, further comprising:
  mapping angular, temporal or spatial variations in light field to individual pixels of the sensor.

\* \* \* \* \*